Figure 1:
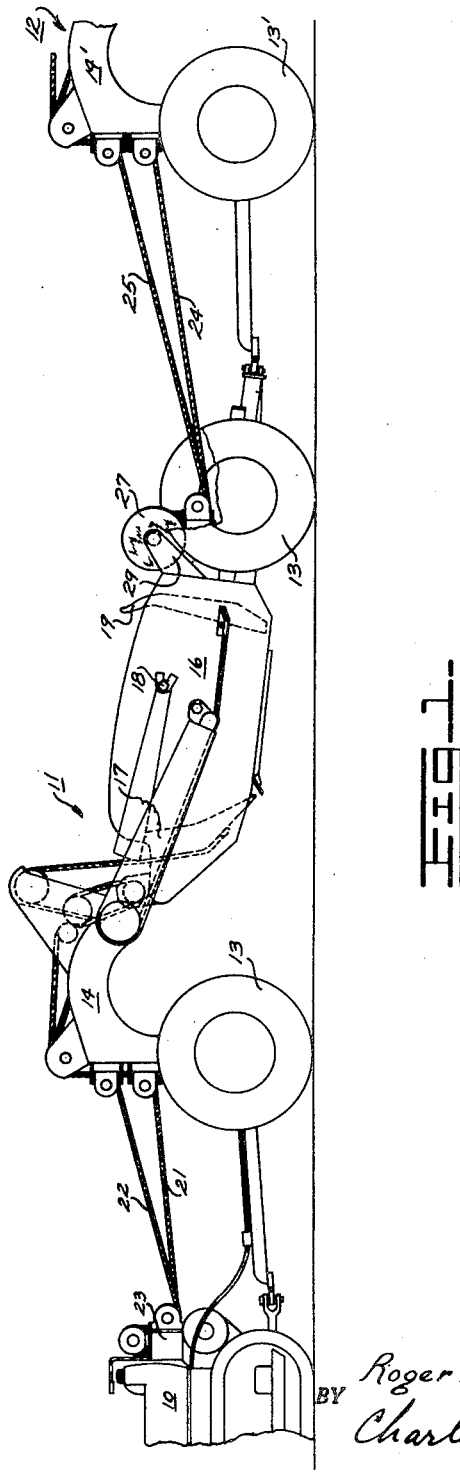

Oct. 25, 1949.     R. M. SMITH     2,486,072
CABLE CONTROL MECHANISM
Filed June 4, 1948     2 Sheets-Sheet 1

INVENTOR.
Roger M. Smith
BY Charles M. Fryer
ATTORNEY

Oct. 25, 1949.  R. M. SMITH  2,486,072
CABLE CONTROL MECHANISM
Filed June 4, 1948  2 Sheets-Sheet 2

INVENTOR.
Roger M. Smith
BY Charles M. Fryer
ATTORNEY

Patented Oct. 25, 1949

2,486,072

UNITED STATES PATENT OFFICE 2,486,072

CABLE CONTROL MECHANISM

Roger M. Smith, Goodyear, Ariz., assignor to Caterpillar Tractor Co., Peoria, Ill., a corporation of California Application June 4, 1948, Serial No. 31,162

5 Claims. (Cl. 37—125)

This invention relates to cable control mechanism in general and more particularly to a cable control mechanism which permits the selective operation of two or more cable controlled implements, connected in tandem, from a single power actuated cable winding drum.

There are many instances where it is desirable to employ a single power actuated cable winding drum for selectively actuating two or more cable controlled implements which are connected in tandem. However, for purposes of illustration, the present invention will be described by reference to a specific mechanism such as a cable control device carried by a tractor which serves as the draft vehicle for a pair of cable controlled earth moving scrapers connected in tandem. Parts of the scrapers are under the control of cables extending to a cable control unit carried by the tractor. The cable control unit is powered for rotation from the tractor engine and is controlled by the tractor operator. It is to be understood however that this invention is applicable to the control of many other types of devices and that this disclosure of a specific mechanism is made for the purpose of illustrating the invention by reference to one specific form which it may assume.

Some cable control units of this type now used for controlling the movable elements of a pair of cable controlled earth moving scrapers connected in tandem require the use of four power actuated cable winding drums; two of which are required for controlling each scraper. The resulting bulk and duplication of controls makes this type of cable control impractical, as well as tending to limit the number of cable controlled scrapers which can be connected in tandem due to space requirements.

It is therefore an object of this invention to provide a simple inexpensive cable control system which permits the selective operation of any number of cable controlled elements connected in tandem.

Further and more specific objects and advantages of this invention are made apparent in the following specification wherein reference is made to the accompanying drawings.

Figure 2:
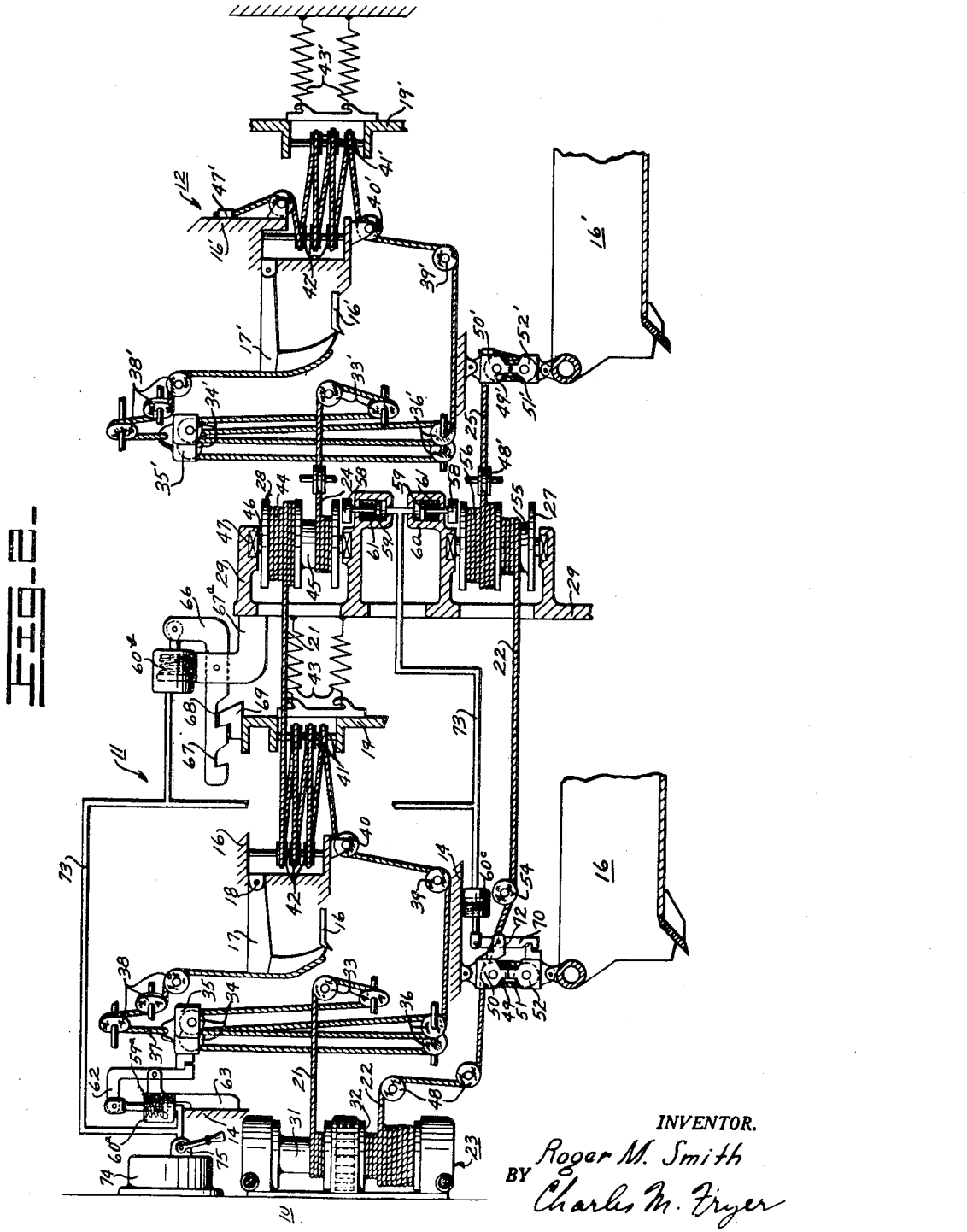

In the drawings:

Fig. 1 is a view in side elevation of a tractor and scraper combination wherein a tractor, partially shown, is drawing and carrying cable controls for a first scraper and a second scraper, also partially shown, and Fig. 2 is a schematic view of the cable control mechanism of the present invention.

Referring to the drawings in detail, Fig. 1 illustrates a tractor 10 employed as the draft vehicle for a pair of earth moving scrapers 11 and 12 connected in tandem. Though the scrapers do not in themselves form a part of the present invention, their principle elements will be briefly described in order to facilitate an understanding of the controls of this invention. Each of the scrapers comprises ground engaging wheels 13, a draft frame 14, and a scraper bowl 16. The scraper bowl 16 is pivotally supported about the axis of the rear wheels and is adapted to be lowered into ground contact for the collection of earth. The forward end of the bowl is adapted to be opened or closed by an apron 17, pivotally supported by a pair of pins, one of which is illustrated at 18 as extending from the side of the scraper bowl. The rear of the scraper bowl is closed by an ejector 19 which is adapted to be moved forwardly with respect to the scraper bowl to discharge the material collected therein. The apron, ejector and bowl of the front scraper 11 are controlled by a pair of cables 21 and 22 extending from the scraper to a conventional double drum cable control unit 23 carried on the rear of the tractor 10. The apron, ejector and bowl of the rear scraper 12 are controlled by a pair of cables 24 and 25 extending forwardly from the scraper to a pair of cable winding motors 27 and 28, only one of which is shown in Fig. 1, and which are carried on suitable brackets 29 rigidly secured to the rear of the scraper bowl 16. The cable winding motors 27 and 28 are actuated by the cables 21 and 22 respectively in a manner presently to be decribed. It is with the apparatus for selectively controlling the movable elements of the two scrapers from the double drum cable control unit 23 carried by the tractor that this invention is concerned.

The manner in which the cable control mechanism functions is schematically illustrated in Fig. 2 of the drawings. In this figure the elements of the rear scraper 12, which corresponds to identical elements of the front scraper 11, are identified by the same reference characters primed. In Fig. 2, the cable control unit 23 is illustrated as comprising a pair of cable winding drums 31 and 32 which are powered for rotation from the tractor 10 by means of a conventional power takeoff (not shown) and controlled by the tractor operator through conventional controls for winding in or paying out the cables 21 and 22 associated therewith. The cable 21 extends from the cable winding drum 31 around a pair of guide sheaves 33, supported in the draft frame 14 of the scraper 11, to a nest of sheaves 34 retained in a sliding sheave block 35 and thence to a nest of sheaves 36 retained in the draft frame 14. The sheave block 35 is secured to a cable 37 which passes around supporting sheaves 38 retained in the draft frame 14 and is anchored at its opposite end to the movable apron 17. Thus, by taking in on the cable 21 with the drum 31, the sliding sheave block 35 is drawn toward the stationary sheaves 36, thus raising the apron 17 to its open position in preparation for loading or unloading operations. Suitable stops (no shown) are provided to limit this movement.

From the sheave nest 36, the cable 21 passes over guide sheaves 39 and 40 to a group of sheaves 41 associated with the sliding ejector 19 and a group 42 supported from the scraper bowl 16. The end of the cable is wound upon and anchored to the cable winding motor 28. Resilient means such as springs 43 is disposed between the ejector 19 and the bowl frame 16 to return the ejector to the normal load carrying position, illustrated, after it has been advanced to eject the material carried by the bowl. Advancing of the ejector is accomplished by continued taking in on the cable 21 after the apron 17 has reached its fully opened position, the springs 43 also serve to prevent movement of the ejector forwardly until the apron has been completely opened.

The cable winding motor 28 comprises a pair of cable drums 44 and 45, rotatable together about a common shaft 46. The shaft 46 is supported in suitable bearings 47 disposed within the brackets 29 extending from the rear of the scraper bowl. The cable 21 associated with the cable winding drum 31 is anchored to the drum 44 while the drum 45 carries the cable 24 associated with apron 17' and ejector 19' of the rear scraper 12. The cable 24 is anchored to the bowl frame 16' of the rear scraper as is indicated at 47'. The arrangement is such that rotation of the drum 31 may impart a like rotation to the drums 44 and 45 of cable winding motor 28 through the cable 21. Rotation of the drum 45 results in the cable 24 associated therewith actuating the apron and ejector of the rear scraper 12 in the same manner as was described in connection with the scraper 11.

The cable 22 extends from the cable winding drum 32 around a pair of guide sheaves 48 supported in the draft frame 14 and thence to a block of sheaves 49 retained in a stationary sheave block 50 supported from the draft frame 14. From the sheaves 49, the cable extends downwardly to a block of sheaves 51 carried in a movable sheave block 52 associated with the front end of the scraper bowl 16. Thus when the cable 22 is paid out from the drum 32, the scraper bowl is lowered into ground contact to permit filling of the bowl. At the completion of the loading operation, the bowl is raised by taking in on the cable 22 thus drawing the sheave block 52 toward the sheave block 50. From the sheaves 49, the cable 22 extends around a guide sheave 54 carried by the draft frame and thence to the cable winding motor 27.

The cable winding motor 27 is identical in construction with the cable winding motor 28 previously described and comprises a pair of cable drums 55 and 56 connected for rotation together about a common shaft. The cable 22 is anchored to the cable winding drum 55 and the cable 25 is anchored to the cable winding drum 56. The cable 25 extends from the drum 56 around guide sheave 48' to sheaves 49'. From the sheaves 49' the cable extends to the sheaves 51' associated with the bowl 16' of the rear scraper and from there is returned to the stationary sheave block 50' where it is anchored. Rotation of the drum 32 may impart like rotation to the drums 55 and 56 by means of the cable 22. Rotation of the drum 56 results in the cable 25 associated therewith actuating the bowl 16' of the rear scraper in the same manner as described in connection with the front scraper.

Brake shoes 58 are associated one with a flange of each of the cable winding motors 27 and 28 and serve to prevent rotation of the cable winding motors thereby permitting the front scraper 11 to be actuated independently of the rear scraper 12 by the manipulation of the cables 21 and 22. Each of the brake shoes 58 is carried on the extending rod of a piston 59 disposed within a power cylinder 60. Engagement of the brake is effected by directing fluid under pressure to the cylinder in a manner presently to be described. A spring 61 is disposed in each of the power cylinders 60 and serves to return the brake shoes to the disengaged position.

In order to render the front scraper inoperative, thereby permitting the rear scraper to be actuated independently of the front scraper, a number of latching devices are associated with the movable elements of the front scraper. Movement of the apron 17 is prevented by a latching mechanism comprising a lever 62 pivotally supported by a bracket 63 extending from the draft frame 14. One end of the lever is associated with a power cylinder 60a while the opposite end is urged into latching engagement with the sliding sheave block 35 by the spring loaded piston 59a disposed within the power cylinder. The latch is normally engaged until fluid under pressure is directed to the power cylinder 60a. At this time, the lever 62 is moved out of latching engagement with the sheave block 35 permitting the apron to be opened.

Movement of the ejector 19 is prevented by a similar latching lever 66, pivotally supported by a bracket 67a rigidly secured to the bowl frame 16. One end of the latch 66 is associated with a power cylinder 60b and is normally urged into its engaged position by a spring loaded piston therein. Disengagement is effected by directing fluid under pressure to the power cylinder at which time the ejector is free to be moved forwardly to unload the scraper bowl. Because the ejector is occasionally prevented from returning to its fully retracted position by the springs 43, due to material becoming lodged in the carriage, spaced notches 67 and 68 are provided in the lever 66 to insure that a latch part 69 associated with the sliding ejector will be received in one of the notches thereby preventing the ejector from being moved forwardly.

Movement of the bowl 16 is prevented by a similar latching device 70 associated with the movable sheave block 52 and which is pivotally supported by a bracket 72 rigidly secured to the sheave block 50. The latch 70 is associated with a power cylinder 60c and is actuated in the same manner as those previously described.

Fluid under pressure is supplied to each of the power cylinders 60, 60a, 60b and 60c through a common conduit 73 from a suitable reservoir 74 carried on the back of the tractor 10. A conventional two position valve 75 is located within easy reach of the tractor operator and serves to either direct fluid through the conduit 73 or to release the pressure in the conduit.

With the cable control mechanism herein described, it is possible selectively to actuate the two scrapers in any desired sequence. However, for purposes of illustration, only one loading and unloading cycle will be described, as it will be apparent how other sequences can be obtained. In order to prevent jack-knifing of the rear scraper when a pusher vehicle is used to augment the power of the draft vehicle while loading, it is usually desirable to load the rear scraper first. This is accomplished by moving the valve 75 to a position wherein any fluid pressure in the conduit 73 is relieved. At this time, the latches 62, 66 and 70 will be urged into latching engagement with the sheave block 35, ejector 19 and sheave block 52 respectively. At the same time, brake shoes 58 associated with the cable winding motors 27 and 28 will be moved to a disengaged position permitting free rotation of the motors. At this time, taking in one the cable 21 by the cable winding drum 31 actuates the cable winding motor 28 to take in on the cable 24 controlling the rear scraper. Taking in on the cable 24 results in the apron 17' being opened by drawing the sheave block 35' toward the sheaves 36'. The bowl 16' is then lowered into ground contact by paying out on the cable 22 from the cable winding drum 32. As the sheave block 52 associated with the bowl 16 of the front scraper is held against movement by the latch 70, a like motion is transmitted to the cable 25 associated with the cable winding motor 27. Paying out on the cable 25 permits the bowl 16' to be lowered into ground contact for loading. After the scraper bowl is loaded, it is returned to a carrying position by taking in on the cable 25, drawing the sheave block 52' upwardly. At the same time, the apron 17' may be closed by its own weight by paying out on the cable 24 from the cable winding motor 28.

Loading of the front scraper 11 is accomplished by moving the valve 75 to a position wherein pressure is directed to each of the power cylinders 60 60a, 60b and 60c, disengaging latches 62, 66 and 70 associated with the sheave block 35, ejector 19 and sheave block 52 respectively and simultaneously moving the brake shoes 58 into frictional engagement with the cable winding motors 27 and 28. At this time, the cable winding motors serve as fixed anchors for the cables 21 and 22 thus permitting the apron 17 to be opened by taking in on the cable 21. In a similar manner, the bowl 16 is lowered into ground contact by paying out on the cable 22. At the completion of the loading, the bowl is raised by taking in on cable 22 and the apron 17 is closed by paying out on the cable 21.

After both of the scrapers have been loaded, they may be transported to the fill or dump, where again the sequence of operation is optional. However, to permit a continuous earth fill to be laid down, it has been found desirable to unload the front scraper first. This is accomplished by moving the valve 75 to a position wherein the fluid is directed under pressure to the power cylinders 60, 60a, 60b and 60c. At this time, the cable winding motors will be prevented from rotating by the brakes 58 thus serving as fixed anchors for the cables 21 and 22. Simultaneously the latches 62, 66 and 70 will be moved out of engagement with the sheave block 35, ejector 19 and movable sheave block 52, respectively, permitting them to be actuated by the cables 21 and 22. The apron 17 is opened by taking in on the cable 21, thus drawing the sliding sheave block 35 toward the sheaves 36 until the sheave block comes against suitable stops (not shown). Continued taking in on the cable 21 causes the sheave nest 41 carried by the ejector 19 to be drawn forwardly toward the sheave nest 42, thus moving the ejector forwardly to displace the material deposited in the scraper bowl. The depth of the fill may be controlled by lowering the bowl to the desired height above the surface of the fill by paying out on the cable 22. After the front scraper 11 has been unloaded, the bowl 16 is returned to its carrying position by taking in on the cable 22. The apron 17 and ejector 19 are returned to the carrying position by paying out on the cable 21. The ejector is retracted by the springs 43 while the apron is lowered by its own weight.

When it is desired to unload the rear scraper, the valve 75 is moved to a position wherein the pressure in the conduit is relieved thus locking the movable elements of the front scraper in the carrying position and simultaneously releasing the brakes 58 associated with the cable winding motors 27 and 28. At this time, the cable winding motors 27 and 28 are actuated by manipulation of the cables 21 and 22, thus permitting the rear scraper to be unloaded in the same manner as the unloading of the front scraper 11 just described.

Thus the system permits the selective operation of two cable controlled scrapers connected in tandem. However, it should be understood, that by addition of suitable cable winding motors, additional air circuits, and latching devices, that any number of cable actuated devices may be connected in tandem and controlled from the conventional double drum cable control unit 23 carried by the tractor.

I claim:

1. In combination with a tractor and two cable controlled implements drawn thereby in tandem, a cable controlled drum on the tractor, a first cable between said drum and controlled parts of the first implement, a second cable control drum on the first implement, a second cable between said second drum and controlled parts of the second implement, and means operable by the first cable for actuating the second cable control drum.

2. In combination with a tractor and two cable controlled implements drawn thereby in tandem, a cable control drum on the tractor, a first cable between said drum and controlled parts of the first implement, a second cable control drum on the first implement, a second cable between said second drum and controlled parts of the second implement, a cable motor drum associated with the second control drum, said first cable being anchored and wound upon said motor drum whereby the operation of the second control drum is controlled by the control drum on the tractor.

3. In combination with a tractor and two cable controlled implements drawn thereby in tandem, a cable control drum on the tractor, a first cable between said drum and controlled parts of the first implement, a second cable control drum on the first implement, a second cable between said second drum and controlled parts of the second implement, a cable motor drum associated with the second control drum, said first cable being anchored and wound upon said motor drum whereby the operation of the second control drum is controlled by the control drum on the tractor and means to lock the motor drum against rotation.

4. In combination with a tractor and two cable controlled implements drawn thereby in tandem, a cable control drum on the tractor, a first cable between said drum and controlled parts of the first implement, a second cable control drum on the first implement, a second cable between said second drum and controlled parts of the second implement, a cable motor drum associated with the second control drum, said first cable being anchored and wound upon said motor drum whereby the operation of the second control drum is controlled by the control drum on the tractor and means to lock the controlled parts of the first implement against operation by the cable.

5. In combination with a tractor and two cable controlled implements drawn thereby in tandem, a cable control drum on the tractor, a first cable between said drum and controlled parts of the first implement, a second cable control drum on the first implement, a second cable between said second drum and controlled parts of the second implement, a cable motor drum associated with the second control drum, said first cable being anchored and wound upon said motor drum whereby the operation of the second control drum is controlled by the control drum on the tractor and means controlled from the tractor to lock the motor drum and release the controlled parts of the first implement for operation by the cable or to lock said parts and release the motor drum.

ROGER M. SMITH.

No references cited.